Patented Aug. 31, 1937

2,091,730

UNITED STATES PATENT OFFICE 2,091,730

PRODUCTION OF ACTIVE CONCENTRATES

Frederic Fenger, Chicago, Ill., assignor to Armour and Company, Chicago, Ill., a corporation of Illinois No Drawing. Application August 6, 1934, Serial No. 738,689

1 Claim. (Cl. 167—74)

The present invention relates to the production of a palatable concentrate of yellow bone marrow, and has particular reference to an improved process for producing a concentrate of this substance which is suitable for administration to living animal organisms as by oral administration.

Heretofore it has been recognized that extracts and concentrates of many elements of the animal body are of considerable value in augmenting deficient bodily secretions of patients affected by glandular and other physical troubles. In some cases the preparation of satisfactory concentrates has proven so difficult that the entire animal substance containing the beneficial ingredients has been administered to a patient, with somewhat unsatisfactory and often distressing results due to the bulk of the animal substance necessarily consumed to provide the requisite amount of the desired ingredients. In each instance the beneficial effects of the animal substance are traceable to certain principles which are present in the animal substance in a relatively small amount. These principles apparently are assimilated upon oral consumption and act as concentrated food products.

Some of the known principles of the type described are water-soluble and in such cases the recovering concentration of the principles has been possible without a great deal of difficulty. However, there is another class of the constituents which have the common characteristic of solubility in oil, and this latter type of principle has presented many difficulties in its recovery, concentration and administration. I have found that the difficulty encountered in the recovery of the oil-soluble principles is due, at least in part, to what appears to be an affinity between the principles and the protein material with which the principles are associated in the animal body.

A principal object of the present invention is the provision of an improved process for the recovery of oil-soluble principles from yellow bone marrow which contains the same in association with protein materials.

A further object is the provision of an improved process for producing fat-soluble concentrates of principles of the type described from yellow bone marrow which contains such ingredients and proteins which heretofore have made separation, recovery and concentration of principles of the type described therefrom somewhat difficult.

These and other objects will be evident from a consideration of the following illustrative and explanative description of my invention.

There are many examples of oil-soluble active principles. The sex hormones constitute one group which is of increasing importance in the treatment of patients having deficient secretions. Other active principles of this type include principles obtainable from yellow bone marrow. These several substances belong to the general class of fat-soluble hormones, which constitute one group of the general class of fat-soluble active principles. In general, it may be said that many of the oil-soluble active principles are sterols or sterol-like bodies of complicated and unknown structure. Particularly is this true in the case of the hormones obtained from bone marrow and the like.

In the animal body the active principles are present in very minute quantities and in some type of admixture or combination with other animal substance, including protein material. This other animal substance may be glandular tissue, muscular tissue, nerve tissue, blood, and animal secretions, such as urine and milk. Ordinarily, the principles are less concentrated in the blood and other body liquids than in the bodily organ in which the principle functions. The blood apparently acts primarily as a carrier for the principles. Milk products, such as skimmed milk, also contain substantial quantities of the fat-soluble active constituents.

Although many fat-soluble active constituents are scattered or distributed in different parts of the animal system, generally each principle has one place in the body where it is most concentrated. For example, the sex hormones naturally will be found in the greatest concentration in the sex organs as in the ovaries of a female. The active constituents which are accountable for the production and formation of white blood corpuscles are found in the yellow bone marrow. In yellow bone marrow the active constituents are combined with animal substance and it appears that these constituents or principles normally tend to cling to or follow the animal substance with which they are in some manner combined or admixed, thereby making recovery, separation and concentration of the active constituents merely by extraction with solvents a difficult matter. In accordance with my invention I have provided a method by which the fat-soluble active constituents of yellow bone marrow are easily recovered and concentrated by the reaction of an alkali with the protein body substance containing the active principles. It has been my discovery that an alkaline solution of proper concentration will attack bodily substance other than the fat-soluble active principles and that the alkali apparently does not have any action upon the active principles.

The substances contained in yellow bone marrow can be classified principally as protein material and fats. If yellow bone marrow is merely treated with solvents in order to obtain the active principles therefrom, considerable quantities of the oil-soluble active principles seem to cling to the residue of protein matter so that the extraction is incomplete and full recovery impossible. According to my improved process the yellow bone marrow containing the desired fat-soluble active principles is comminuted and subjected to treatment with an alkaline solution of sufficient strength and for a sufficient time to liquefy or hydrolyze the protein content of the yellow bone marrow. I have found that to obtain proper action on the protein content of the yellow bone marrow the alkali also should be used in sufficient quantities to take care of the fat content of the yellow bone marrow by saponification. It has been my discovery that the proteins may be liquefied without deleteriously affecting the fat-soluble active principles. Therefore, after suitable treatment with the alkali the solution contains solubilized proteins, saponified fats, and fat-soluble active principles. The recovery of the fat-soluble active principles then is accomplished by means of a selective solvent for such principles. After treatment with alkali in the manner described the yellow bone marrow no longer holds its attraction for the active principles and substantial recovery of the latter is possible. After hydrolyzation, the connection between the active principles and the proteins is broken.

As a specific application of my process, to which my invention is not limited, the following example is given.

Fresh yellow bone marrow may be removed from the bones of recently slaughtered animals and finely minced. This material, still containing moisture, cell structure, blood vessels, and other animal substance is mixed in the quantity of one kilogram with a solution containing 750 c. c. of alcohol, 250 c. c. of water, and 250 grams of potassium hydroxide.

The vessel in which the yellow bone marrow and the solution are contained is provided with a reflux condenser and a tube for carrying nitrogen to the bottom of the vessel. The vessel is then heated upon a water bath and maintained at a temperature of between 80° C. and 90° C., the mixture being stirred by means of a stream of nitrogen until the fat content of the vessel has been saponified and the proteins hydrolyzed or liquefied. Ordinarily, the time for this action may be of the order of one hour. After the action is complete substantially 750 c. c. of water is added to the mixture and the mixture is allowed to cool. The solubilized animal matter forms a solution which may, if desirable, be syphoned off from the reaction vessel and partly neutralized. Two liters of ethyl ether are added to the vessel and the mixture is well stirred with nitrogen. Other volatile selective solvents such as petroleum ether and acetone may be employed for extracting the active principles. Subsequent extractions of the protein-soap solution are made until the ether remains colorless after being agitated with the solution.

The extracts of the protein-soap solution are combined and washed to remove the soap and alkali carried by the solvent. This washing may be facilitated by agitation with nitrogen. If desired, the solvents may be clarified and filtered in any convenient manner. The filtrate is evaporated at reduced pressure and a low temperature and in an atmosphere of nitrogen. The temperature of the evaporation may be of the order of 60° C. A reddish colored residue is obtained and this residue is found to contain the physiologically-active constituents of the bone marrow. Preferably, the residue is dissolved in a sufficient quantity of an edible vegetable oil so that five drops of the oil solution represent ten grams of fresh bone marrow. The oil solution of the active principles may be administered orally without taxing the digestive system. It is preferred to carry out the entire process in an atmosphere of nitrogen or other inert gas, since the presence of oxygen apparently has a deleterious effect upon the active principles.

Although it has been specified in the example that the active concentrates are incorporated in an edible oil, it will be found desirable in many cases to employ semi-solid or solid hydrogenated fats and oils as carriers for the active fractions. The mode of administration may be varied as desired to comply with the particular requirements of individual patients, and the carrier or media of dispersion for the active fraction, if employed, may be other than those named.

The process given in the example may be varied to advantage by subjecting the solution of animal matter to an evaporation step which may extend to dryness prior to extraction of the active constituents with suitable solvents.

An important feature of my improved process is that it recovers and concentrates the fat-soluble active constituents in such form that they may be administered orally without taxing the digestive system. For example, it requires considerable digestive effort to digest and assimilate a heaping tablespoonful of yellow bone marrow fat. Also, the bone marrow fat is quite unpalatable. Practically no digestive effort is required to absorb the five drops of the concentrate produced in accordance with my process. In most cases yellow bone marrow is prescribed by physicians in the amount of a heaping tablespoonful three or four times a day.

Many active principles, other than those of the oil-soluble group, are destroyed by alkaline materials. Of these may be mentioned some of the principles obtainable from the posterior pituitary gland and epinephrin or "adrenalin" obtained from the suprarenal glands. The two principles mentioned do not belong to the fat-soluble class of active principles.

Other alkalis than potassium hydroxide may be employed in liquefying the protein materials and releasing the active principles therefrom. Sodium, barium, and calcium hydroxides may be employed for the purpose described. Also, organic alkaline substances such as ethanol amine and methyl amine may be employed. The hydrolyzed protein mixture also may be dried and powdered prior to extraction with suitable solvents. The exact amount of alkali required in any case will depend upon such factors as the nature of the tissue. The alkaline solution is made of such concentration and is employed in the treatment of the animal substance for a sufficient period of time to render the protein content of the animal substance soluble. A low temperature is desirable in order that the fat-soluble active constituents will not be deleteriously affected by heat.

The recovered and concentrated active principles may be further purified by fractionation with various concentrations of alcohol or by other means. The concentration and purity of the product are such as to render an oil suspension particularly desirable for administration in cases such as agranulocytosis. Suitable animals from which to obtain the desired active constituents may be fish, fowls and mammals.

Various modifications of the embodiments of the invention described herein for the purpose of illustration and explanation are possible without departing from the scope of my invention and all such changes are intended to be included in the appended claim.

I claim:

The method of producing a concentrate of yellow bone marrow which comprises subjecting yellow bone marrow to saponification and hydrolyzation with a solution of an alkali in alcohol and water to hydrolyze the proteins and saponify the fats, and recovering the unaffected compounds.

FREDERIC FENGER.